(12) United States Patent
Rozhenkov et al.

(10) Patent No.: US 11,025,999 B2
(45) Date of Patent: Jun. 1, 2021

(54) SYSTEM OF AUTOMATIC CREATION OF A SCENARIO VIDEO CLIP WITH A PREDEFINED OBJECT

(71) Applicant: FUN EDITOR LLC, Nizhny Novgorod (RU)

(72) Inventors: Anton Vladimirovich Rozhenkov, Nizhniy Novgorod (RU); Sergey Sergeevich Klyuev, Nizhniy Novgorod (RU); Denis Evgenyevich Kalinichenko, Nizhniy Novgorod (RU); Dmitry Vyacheslavovich Gurichev, Nizhniy Novgorod (RU)

(73) Assignee: FUN EDITOR LLC, Nizhny Novgorod (RU)

( * ) Notice: Subject to any disclaimer, the term of this patent is extended or adjusted under 35 U.S.C. 154(b) by 0 days.

(21) Appl. No.: 16/980,681

(22) PCT Filed: Feb. 27, 2019

(86) PCT No.: PCT/RU2019/000128
§ 371 (c)(1),
(2) Date: Sep. 14, 2020

(87) PCT Pub. No.: WO2019/177493
PCT Pub. Date: Sep. 19, 2019

(65) Prior Publication Data
US 2021/0021912 A1    Jan. 21, 2021

(30) Foreign Application Priority Data
Mar. 15, 2018 (RU) ............................ RU2018109275

(51) Int. Cl.
*H04N 21/8541* (2011.01)
*G06K 9/00* (2006.01)
(Continued)

(52) U.S. Cl.
CPC ...... *H04N 21/8541* (2013.01); *G06K 9/00744* (2013.01); *G06K 9/00758* (2013.01); *H04N 21/21805* (2013.01); *H04N 21/234* (2013.01)

(58) Field of Classification Search
CPC ......... H04N 21/8541; H04N 21/21805; H04N 21/234; G06K 9/00744; G06K 9/007458
See application file for complete search history.

(56) References Cited

U.S. PATENT DOCUMENTS 9,208,226 B2    12/2015 Park et al.
2004/0240542 A1    12/2004 Yeredor et al.
(Continued)

FOREIGN PATENT DOCUMENTS

RU    2470362    12/2012
RU    2475853    2/2013
(Continued)

OTHER PUBLICATIONS

International Search Report for PCT/RU2019/00128, dated Jun. 27, 2019, 2 pages.
(Continued)

*Primary Examiner* — Mishawn N. Hunter
(74) *Attorney, Agent, or Firm* — Nixon & Vanderhye P.C.

(57) ABSTRACT

A system for automatic creation a scenario video clip with a predefined object or a group of objects in the frame comprises: a shooting unit, a data storage module, a predefined object or a group of objects identification in primary video data unit; an object or a group of objects data input unit for their identification; provided that the system in addition comprises: a relevant video data retrieval unit with the predefined object or the group of objects in the frame; a relevant video data processing unit; at least one scenario pattern including data set for operation of shooting unit, retrieval unit and processing unit.

8 Claims, 1 Drawing Sheet

(51) Int. Cl.
*H04N 21/218* (2011.01)
*H04N 21/234* (2011.01)

(56) References Cited

U.S. PATENT DOCUMENTS

| | | | |
|---|---|---|---|
| 2008/0052315 A1* | 2/2008 | Kasahara | G06F 16/739 |
| 2010/0026809 A1* | 2/2010 | Curry | G06K 9/209 |
| | | | 348/157 |
| 2017/0134714 A1* | 5/2017 | Soni | H04N 5/265 |
| 2018/0033153 A1 | 2/2018 | Hirasawa et al. | |

FOREIGN PATENT DOCUMENTS

| | | |
|---|---|---|
| RU | 2492585 | 9/2013 |
| RU | 2635066 | 11/2017 |

OTHER PUBLICATIONS

Written Opinion of the ISA for PCT/RU2019/00128, dated Jun. 27, 2019, 5 pages.

* cited by examiner

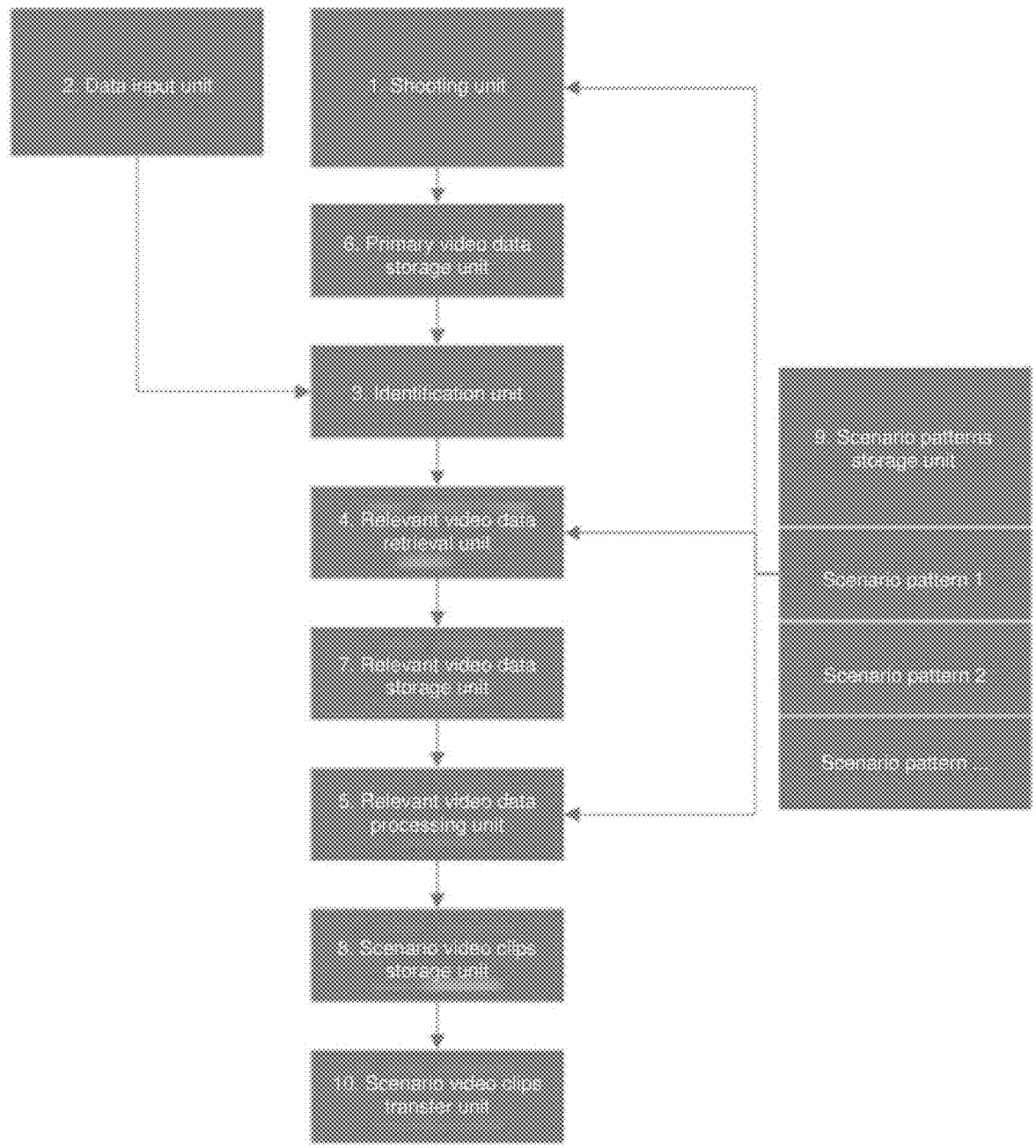

SYSTEM OF AUTOMATIC CREATION OF A SCENARIO VIDEO CLIP WITH A PREDEFINED OBJECT

This application is the U.S. national phase of International Application No. PCT/RU2019/000128 filed 27 Feb. 2019, which designated the U.S. and claims priority to RU Patent Application No. 2018109275 filed 15 Mar. 2018, the entire contents of each of which are hereby incorporated by reference.

FIELD OF THE INVENTION

The invention relates to the systems of a scenario video clip creation with a predefined object or a group of objects present within the frame using an identification system. The system is designed to form a video clip captured in the places of entertainment, cultural and sport events with a predefined scenario. The purpose of creation of such video clips is to preserve impressions related to participation in competitions or visiting a certain place, and to increase popularity of a place where video clips were captured.

PRIOR ART

Tracking systems based on data obtained from multiple video cameras using tracking object identification technologies are known from the prior art.

it is known a method of human objects detection in video, patent RU 2635066, IPC G06K9/00, published on Aug. 11, 2017. The known patent discloses methods, devices and systems for video content analysis to detect people or other objects of interest in a video image. People detection can be used to count large numbers of people in a crowd, locate each person, and/or perform crowd analysis in controlled areas.

It is known a system of customers' real-time in-shop location tracking using multiple communication network, patent RU 2470362, IPC G06Q 30/02. G08C 21/00, published on the Dec. 12, 2012. The known system is designed for determining and tracking a person's location in a shop by means of video cameras, while the given person uses an electronic device that allows locating them in the shop area.

It is known an object tracking system and method, application US2018033153, IPC G06K 9/00, published on Feb. 1, 2018, which we take as a prototype. The known system includes multiple video cameras positioned in a certain area, object identification unit enabling to locate an object with high precision and video cameras data storage unit. The known technical solution enables to create a video where a predefined tracking object is present to a high precision.

The known technical solutions relate to video surveillance systems and enable to improve security of the protected area, e.g. shop or shopping centre. The known systems enable to keep track of an object either in real time or on previously recorded video data stored on a server. Users of the known systems—security staff who specify the tracking object (certain person), time interval and date by means of the system interface and obtain a video clip which has the specified tracking object. Operation of the known systems is based on human identification by video data obtained from security cameras. The weak side of the known systems is their limited functionality, which does not allow creating video clips with a predefined scenario.

DISCLOSURE OF THE INVENTION

The technical result of the proposed invention is the enhancement of a video surveillance system to enable creation of a scenario video clip with predefined object or a group of objects in the frame.

The technical result is achieved by the proposed system for automatic creation of a scenario video clip with a predefined object or a group of objects in the frame, which comprises:

a shooting unit, including at least one primary video data recorder.

a data storage module, including primary video data storage unit;

a predefined object or a group of objects identification in primary video data unit;

an object or a group of objects data input unit for their identification;

provided that the system in addition comprises:

a relevant video data retrieval unit with the predefined object or the group of objects in the frame;

a relevant video data processing unit;

at least one scenario pattern including data set for operation of shooting unit, retrieval unit and processing unit;

provided that, the data storage module additionally includes a relevant video data storage unit, a scenario patterns storage unit and a scenario video clips storage unit.

The relevant video data processing unit is predominantly arranged to create scenario video clips based on relevant video data and scenario pattern data. In particular, the identification unit can include an electronic device with unique identifier. The proposed system can additionally comprise a scenario video clips transfer unit using at least one of the following methods: online broadcasting, recording, transmission via the Internet, or via social networks in particular. Provided that, the data input unit can be arranged to select a scenario pattern and to select a method of a scenario video clip transfer by the transfer unit. The shooting unit can additionally comprise a telemetry system. The proposed system can be arranged to create a real time scenario video clip.

The proposed invention is supported by figures.

FIG. 1 demonstrates a general diagram of the system for automatic creation of a scenario video clip with a predefined object or a group of objects in the frame.

"Scenario pattern" in this description is understood to be a data set for operation of the certain system units, which define a plot and artistic style of the scenario video clip.

"Predefined object" in this description is understood to be a moving object of a customer interest and which presence the customer would like to capture in the video clip. It could be the customer themselves if the aim of the scenario video clip is preserving the impressions from an entertainment. It could be a car when the entertainment territory is a racetrack. It could be a competitor, for example, in case of a sport competition.

"Customer" in this description is understood to be a person who obtains, using a certain method, a ready scenario video clip created by the proposed system.

The proposed system of a scenario video clip creation with a predefined object or a group of objects in the frame due to identification system comprises the following units:

A shooting unit (1) including at least one primary video data recorder. Standard video cameras, different focal distance video cameras, controlled video cameras, including those installed on remotely controlled unmanned aerial vehicles can be used as primary video data units. Predominantly, the shooting unit comprises multiple video cameras of different kinds, which use the scenario pattern data in their operation. The scenario pattern data in terms of the shooting unit operation include, in particular, data specifying frame view, depth, frame geometry, objective field of view, camera movement, predefined object zooming in/out in the frame, etc. The shooting unit can additionally comprise a telemetry system. Normally, a telemetry system comprises sensors installed on a predefined object and generating their state data. For example, in case of auto and motor racing the telemetry system includes sensors installed on a vehicle and the pilot, which determine the vehicle state (speed, fuel consumption, time, etc.) and the pilot state (e.g. heart rate) data during run. Availability of the telemetry system data dynamics in the final scenario video clip definitely increases interest of a customer to it and improves its spectacularity.

A redefined object data input unit (2) for object identification. Predominantly, the data input unit comprises interface by means of which the customer of the proposed system inputs data enabling to identify the predefined object. For example, it could be person's full name, profile in social network, login. Data input unit can be arranged to select scenario pattern. Predominantly, the system includes multiple scenario patterns and the customer can select the one, which is more appealing in terms of plot, artistic style and price. Data input unit can be arranged to select a method of a scenario video clip transfer to a customer. The methods could be different, in particular, online broadcasting of a scenario video clip, recording of a scenario video clip to a data storage device (USB drive, disk), transmission of a scenario video clip via the Internet and social networks.

A predefined object identification on primary video data unit (3). The identification unit includes devices and software, which enable to identify and locate the predefined object on primary video data and put certain marks. Operation of this unit can be based on different methods of the predefined object identification. In particular, the identification unit can include an electronic device with unique identifier, the wireless communication that enables to locate the predefined object. An example of such electronic device could be an electronic bracelet put on a person. In case of racing, such electronic device is installed on a vehicle. The other example of such electronic device could be a personal phone of the predefined person, on which a special program is installed. Having located the predefined object at a certain point the identification unit marks the primary video data captured at this point by cameras within the area of which the object was located. Operation of the identification unit could be also based on personal biometric identification in primary video data.

A relevant video data retrieval unit (4) with a predefined object in the frame includes software, which enables to cut out video segments with a predefined object in the frame from the primary video data using the marks put by the identification unit and scenario pattern data. Scenario pattern data in terms of generation of relevant video data include, in particular, data specifying the predefined object location in the frame, video segment length, number of video segments, frame synchronization, etc.

A relevant video data processing unit (5) includes software, which enables to form scenario videos using relevant data generated by the retrieval unit and scenario pattern data. Scenario pattern data in terms of the processing unit (5) operation include, in particular: data specifying video editing type, video editing rhythm, duration of a video editing episode, sequence of views and frames, color grading, attention focusing on certain objects in a frame, addition of graphic special effects, frame matching with the telemetry system data, etc.

A data storage module represents one or several devices, e.g. servers. The data storage module comprises several units, including the primary video data storage unit (6), relevant video data storage unit (7), scenario patterns storage unit (8), scenario video clips storage unit (9).

The proposed system can additionally comprise a scenario video clip transfer unit (13). The transfer unit is arranged to transfer ready scenario video clips to a customer using at least one of the following methods: online broadcasting, recording, transmission via the Internet, or via social networks in particular.

Units being included into the proposed system interact at different steps and transmit information to each other using different technologies: cable, Internet, wireless connection, etc. If necessary, the information is codified at certain steps to keep it secure and inaccessible to unauthorized users of the system.

EMBODIMENT OF THE INVENTION

The proposed system operates as follows.

Customer or user of the system inputs the predefined object data through the data input unit (2) and, if possible, selects a method of the ready scenario video clip transfer to them. If the proposed system comprises several scenario patterns, the user selects a scenario pattern of interest from a multitude. The shooting unit (1) generates primary video data in the predefined object location area in accordance with the scenario pattern data and transmits the information to the primary video data storage unit (6). The identification unit (3) receives information required for identification of the predefined object from the input unit (2), identifies and locates the predefined object in the primary video data and puts certain marks. Then, the retrieval unit (4) according to marks and scenario pattern data generates a set of relevant video data with the predefined object in the frame and transmits them to the relevant video data storage unit (7). Then, the processing unit (5) cuts scenario videos using the relevant data generated by the retrieval unit (4) and the scenario pattern data, and stores the ready scenario video clip in the scenario video clips storage unit (9). Then the transfer unit (10) transfers the ready scenario video clip to the customer by the selected method.

Composition and operation of the proposed system are described taking into account one predefined object in the frame. In case of several objects, the composition and operation of the proposed system are not changed.

The proposed system can be configured to create a scenario video clip online that is particularly topical during broadcasting of sport and other events.

INDUSTRIAL APPLICABILITY

The example of the proposed system implementation could be on a go-cart racing. A client decided to take part in a go-cart racing provides the information needed upon registration, selects a scenario pattern by viewing segments of different scenario video clips examples and selects a method of transferring the future scenario video clip with their participation to them. Provided that, the client is assigned a unique number corresponding to a certain cart, and put on an electronic bracelet. Then, the client prepares for a run in a changing room where their shooting by video cameras has already begun. Then, the client moves to the other location, e.g. pit lane zone, where he takes instructions and gets into a cart. The identification unit locates the client by the electronic bracelet in each new location. Meanwhile, the client shooting in each new location is performed by different video cameras in accordance with the selected scenario pattern data. During run the primary video data are collected from video cameras shooting the cart on the race track, and by video cameras installed inside the cart. At the same time, the client is identified during the run by the electronic device installed in the cart and by the relevant unique number assigned during registration. Upon completion of the run the client receives the ready video clip by any method selected by him, for example, by sending it to a social network of the client's profile. The client is satisfied, since he has preserved impressions after visiting the entertainment park, and he can share this video with his friends and family.

The other example of the proposed system implementation could be as follows. The client participating in the competition (motor racing) is identified in the system with his permission. Then, the client within a period of time changes his location in the competition area: visits the equipment exhibition, sponsors' activities and takes his seat on the stand. The system locates the client in each new location and collects videos with his presence in the frame. When a sportsman moves to the finishing line, one of the system cameras points at the client and shoots him. The proposed system processes video materials from different cameras with the predefined client in the frame and creates a video clip in accordance with the certain scenario pattern, Then, the system sends the video clip with the client presence at the competition to the client—by a social network or broadcasts online as a story in the social network within his profile.

One more example of the proposed system implementation in sport events could be as follows. Video cameras positioned on the racetrack and combined within the system follow the sportsmen on the racetrack. Provided that, the system automatically creates a scenario video only with the most interesting moments. For example, if a racer falls off the motorcycle or he rides close to the other pilot, or other possible moments.

It is obvious that the proposed invention enables to enhance the video surveillance system and create a scenario video clip with predefined object or a group of objects in the frame.

The invention claimed is:

1. A system for automatic creation of a scenario video clip with a predefined object or a group of objects in a frame comprising: a shooting unit, including at least one primary video data recorder; a data storage module, including primary video data storage unit; a predefined object or a group of objects identification in primary video data unit; a predefined object or group of objects data input unit for their identification; characterized in that it additionally comprises: a relevant video data retrieval unit with the predefined object or the group of objects in the frame, wherein relevant video data are understood as video segments with the predefined object in the frame cut out from primary video data using marks put by an identification unit;

a relevant video data processing unit; at least one scenario pattern including data set for operation of the shooting unit, relevant video data retrieval unit and relevant video data processing unit, wherein, each recorder of the primary video data from the shooting unit operates according to the scenario pattern data, which in terms of the shooting unit operation is the data specifying frame view, depth, frame geometry, objective field of view, camera movement, predefined object zooming in/out in the frame; wherein, the relevant video data retrieval unit includes software which enables to cut out video segments with the predefined object in the frame from the primary video data using the marks put by the identification unit and scenario pattern data, where the scenario pattern data in terms of generation of relevant video data includes the data specifying the predefined object location in the frame, video segment length, number of video segments, frame synchronization; wherein, the relevant video data processing unit includes software, which enables to form scenario video clip using relevant data generated by the retrieval unit and scenario pattern data, where the scenario pattern data in terms of the processing unit operation includes, in particular, the data specifying video editing type, video editing rhythm, duration of video editing episode, sequence of views and frames, color grading, attention focusing on certain objects in a frame, addition of graphic special effects, frame matching with the telemetry system data; provided that, the data storage module additionally includes the relevant video data storage unit, scenario patterns storage unit, and scenario videos storage unit.

2. The system according to claim 1, characterized in that the relevant video data processing unit is arranged to create scenario video clips based on the relevant video data and scenario pattern data.

3. The system according to claim 1, characterized in that the identification unit includes an electronic device with unique identifier.

4. The system according to claim 1, characterized in that it additionally comprises a scenario video transfer unit using at least one of the following methods: online broadcasting, recording, transmission via the Internet, or via social networks in particular.

5. The system according to claim 1, characterized in that the data input unit is arranged to select a method of scenario video transfer by a transfer unit.

6. The system according to claim 1, characterized in that the data input unit is arranged to select a scenario pattern.

7. The system according to claim 1, characterized in that the shooting unit additionally comprises a telemetry system.

8. The system according to claim 1, characterized in that it is arranged to create real time scenario video clip.

* * * * *